(12) United States Patent
Kawakatsu et al.

(10) Patent No.: US 7,946,925 B2
(45) Date of Patent: May 24, 2011

(54) DYNAMIC DAMPER

(75) Inventors: Tsutomu Kawakatsu, Utsunomiya (JP);
Shouichi Nakao, Utsunomiya (JP);
Susumu Suzuki, Mooka (JP); Takao Kurihara, Mooka (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 552 days.

(21) Appl. No.: 11/992,197

(22) PCT Filed: Sep. 21, 2006

(86) PCT No.: PCT/JP2006/318782
§ 371 (c)(1),
(2), (4) Date: Mar. 18, 2008

(87) PCT Pub. No.: WO2007/034896
PCT Pub. Date: Mar. 29, 2007

(65) Prior Publication Data
US 2009/0270189 A1    Oct. 29, 2009

(30) Foreign Application Priority Data
Sep. 21, 2005   (JP) ................... 2005 273720

(51) Int. Cl.
*F16F 7/104*   (2006.01)
(52) U.S. Cl. ...................... 464/180; 188/380

(58) Field of Classification Search .......... 464/180; 267/141, 141.2; 188/379, 380
See application file for complete search history.

(56) References Cited

U.S. PATENT DOCUMENTS

| 4,016,962 | A | * | 4/1977 | Black ................. 188/380 X |
| 5,090,668 | A | | 2/1992 | Hamada |
| 6,485,370 | B1 | * | 11/2002 | Kurosu et al. ............ 464/180 |
| 6,523,843 | B2 | * | 2/2003 | Wiesemann et al. ... 267/141.2 X |
| 2007/0251783 | A1 | * | 11/2007 | Kuwayama ............... 188/380 |

FOREIGN PATENT DOCUMENTS

| JP | 59-003041 | 1/1984 |
| JP | 02-154827 | 6/1990 |
| JP | 3-25048 | 3/1991 |
| JP | 09-089047 A | 3/1997 |
| JP | 2003-254386 | 9/2003 |
| JP | 2005-221048 A | 8/2005 |

* cited by examiner

*Primary Examiner* — Greg Binda
(74) *Attorney, Agent, or Firm* — Squire, Sanders & Dempsey (US) LLP

(57) ABSTRACT

A dynamic damper in which the inner diameter (D2) of a first hole part formed at the axial one end part of a body part overlapped with a weight part in the radial direction is set smaller than the inner diameter (D3) of a second hole part formed at the axial other end part of the body part not overlapped with the weight part in the radial direction and tightened with a band member (D3>D2). The outer diameter (D1) of a drive shaft to be press-fitted into the first and second hole parts is set larger than the inner diameter (D2) of the first hole part and the inner diameter (D3) of the second hole part (D1>D3>D2).

2 Claims, 12 Drawing Sheets

DYNAMIC DAMPER

TECHNICAL FIELD

The present invention relates to a dynamic damper mounted on a rotational shaft such as a drive shaft of an automobile, for damping hazardous vibrations developed on the rotational shaft.

BACKGROUND ART

Heretofore, there is known a dynamic damper mounted on a rotational shaft such as a drive shaft or a propeller shaft of an automobile, for damping hazardous vibrations which should not be caused, such as flexural vibrations, torsional vibrations, etc. that are developed due to an unbalanced rotational behavior caused when the rotational shaft rotates.

The dynamic damper has a function to absorb the vibrational energy of the rotational shaft by converting the vibrational energy into vibrational energy of the dynamic damper by way of resonance, with the natural frequency of the dynamic damper being equal to the dominant frequency of excited hazardous vibrations of the rotational shaft.

One dynamic damper of the above type, which is disclosed in Patent Document 1, for example, comprises a boss having a center hole with a rotational shaft such as a drive shaft press-fitted therein, a ring-shaped weight (a mass portion) disposed concentrically with the boss, an elastic connector for connecting the boss and the weight radially, and a fixing band tightened on the outer circumferential surface of the boss to fix the boss to the rotational shaft.

Further, a dynamic damper disclosed in Patent Document 2 comprises a boss having locking grooves at both axial ends, a ring-shaped mass portion disposed around the boss, and fixing bands wound on the locking grooves for fixing the boss.

However, the dynamic dampers disclosed in Patent Documents 1 and 2 are disadvantageous in that water may penetrate into a clearance between the rotational shaft and the inner wall surface of the boss in a portion where the fixing band is not tightened on the boss.

The dynamic damper mounted on the rotational shaft such as a drive shaft or propeller shaft is generally used in a harsh air environment near the surface of the ground. When the dynamic damper is used for a long period under such an environment, a material such as rubber fatigues, and its tightening force on the rotational shaft is lowered. As a result, water can penetrate into the clearance between the rotational shaft and the inner wall of the boss in the portion where the fixing band is not tightened on the boss.

The above problem can be solved by reducing the inner diameter of the boss to improve the contact between the inner wall surface of the boss and the outer circumferential surface of the rotational shaft. However, in this case, an increased force is required to press-fit the rotational shaft into the boss against the inner wall surface thereof when the dynamic damper is mounted on the rotational shaft. Thus, the working efficiency is reduced, and an additional press-fit apparatus or the like is required other than existing facilities, resulting in higher production costs.

Further, when the increased force is applied to press-fit the rotational shaft into the boss, against the inner wall surface thereof the inner wall of the boss is excessively stressed and deformed. Particularly, in the boss, the portion to be tightened by the fixing band is thinner than the other portions, and thereby is deformed and extended in the direction of pressing the rotational shaft.

Patent Document 1: Japanese Laid-Open Utility Model Publication No. 59-003041
Patent Document 2: Japanese Laid-Open Patent Publication No. 02-154827

DISCLOSURE OF THE INVENTION

A general object of the present invention is to provide a dynamic damper that can prevent external-water or the like from penetrating thereinto.

A principal object of the present invention is to provide a dynamic damper that can be mounted on a rotational shaft more efficiently.

In a dynamic damper of the present invention, a through hole formed in a main body has an inner diameter $D2$ at one axial direction end overlapping with a mass portion in the radial direction, and the inner diameter $D2$ is smaller than the outer diameter $D1$ of a rotational shaft to be press-fitted in the through hole. Therefore the inner wall surface of the through hole having the inner diameter $D2$ can be in sufficient contact with the outer circumferential surface of the rotational shaft at the one end such that penetration of water between the surfaces can be prevented effectively.

Further, in the present invention, the through hole formed in the main body has an inner diameter $D3$ at the other axial direction end not overlapping with the mass portion in the radial direction, the inner diameter $D3$ is larger than the inner diameter $D2$ at the one end, the main body is thin-walled in the vicinity of the other end, and a band is tightened on the thin-walled portion. Therefore the through hole having the inner diameter $D3$ can be in sufficient contact with the outer circumferential surface of the rotational shaft at the other end as with at the one end such that penetration of water can be prevented effectively.

Thus, in the present invention, the main body can be in desired contact with the rotational shaft at both of the one axial direction end and the other axial direction end of the main body, whereby the water penetration through a clearance between the inner wall of the through hole in the main body and the outer circumferential surface of the rotational shaft can be prevented at both ends.

In the present invention, force required to press-fit the rotational shaft in the through hole of the main body is different between at the thick-walled portion of the main body in the vicinity of the one axial direction end and at the thin-walled portion of the main body in the vicinity of the other axial direction end, and also elastic deformation of the main body is different between the portions in the vicinity of one and the other axial direction ends. That is, the elastic deformation and the press-fitting force are large at the one end of the main body overlapping with the mass portion, while the elastic deformation and the press-fitting force are small at the other thin-walled end of the main body not overlapping with the mass portion.

Thus, in the present invention, the attachment of the rotational shaft along the main body can be improved, and the deformation of the thin-walled portion can be prevented, so that deterioration of the characteristics of the dynamic damper can be prevented.

Further, in the present invention, the rotational shaft is preferably press-fitted in the through hole from the one end with the inner diameter $D2$ to the other end with the inner diameter $D3$. In this case, tight sealing can be achieved between the rotational shaft and a first hole portion in the vicinity of the one end with the smaller inner diameter and between the rotational shaft and a second hole portion in the vicinity of the other end with the larger inner diameter on which the band is tightened, so that the water penetration can be prevented effectively at both ends.

BEST MODE FOR CARRYING OUT THE INVENTION

Figure 1:
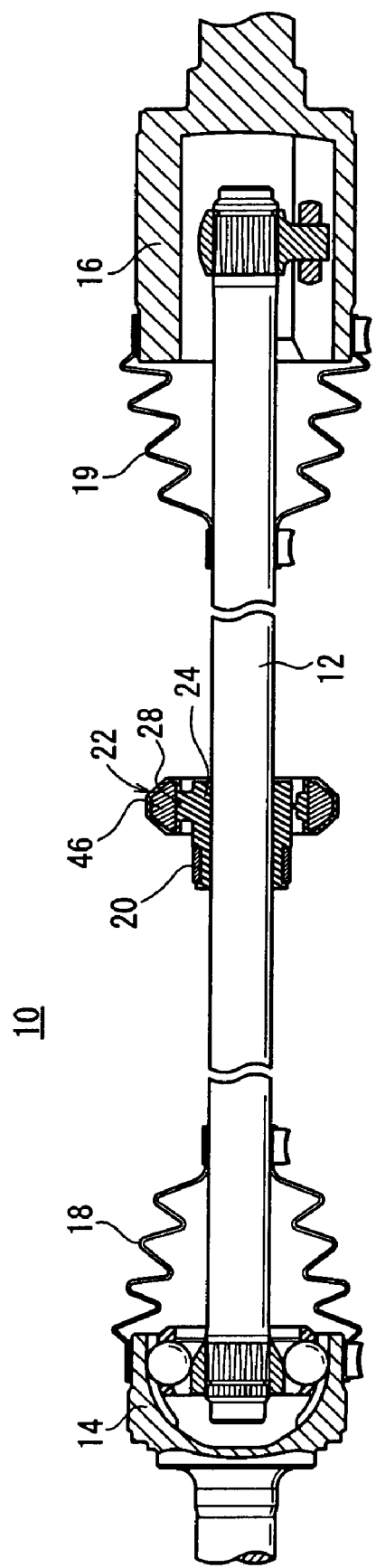
FIG. 1 is a vertical cross-sectional view, partly omitted from illustration, of a drive force transmitting mechanism incorporating a dynamic damper according to an embodiment of the present invention.
Figure 2:
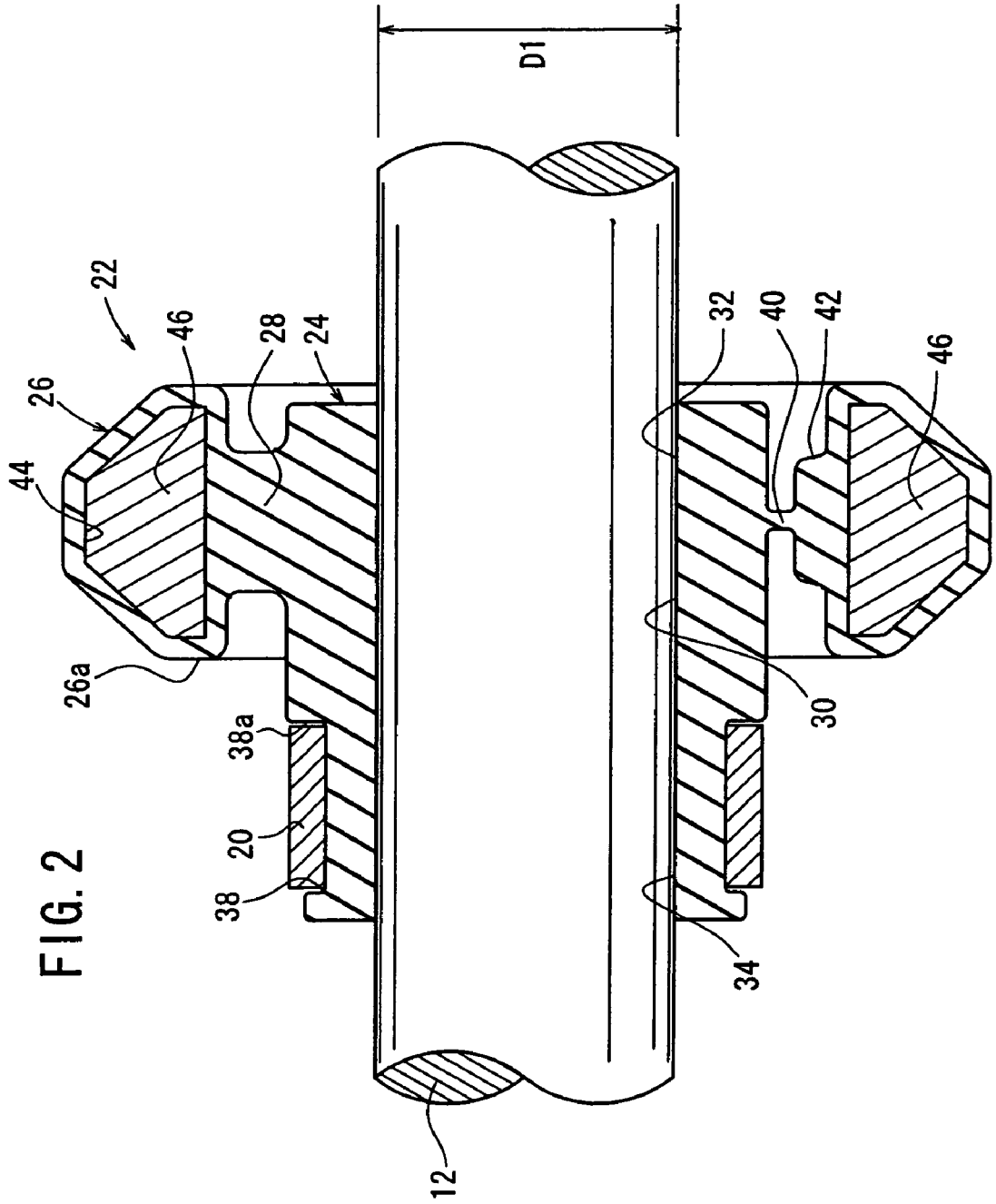
FIG. 2 is an enlarged vertical cross-sectional view of the dynamic damper of the drive force transmitting mechanism.

FIG. 1 is a vertical cross-sectional view, partly omitted from illustration, of a drive force transmitting mechanism in which a dynamic damper according to an embodiment of the present invention is mounted on a drive shaft as a rotational shaft, and FIG. 2 is an enlarged vertical cross-sectional view of the dynamic damper mounted on the drive shaft.

The drive force transmitting mechanism 10 contains a drive shaft 12 having an outer diameter D1 as shown in FIG. 2, and a Birfield constant velocity universal joint 14 and a tripod constant velocity universal joint 16 which are joined to the respective ends of the drive shaft 12. Joint boots 18, 19 made of rubber or resin are mounted respectively on the Birfield constant velocity universal joint 14 and the tripod constant velocity universal joint 16. A dynamic damper 22 is mounted substantially centrally on the drive shaft 12 by a band 20 such as a stainless steel band.

Figure 3:
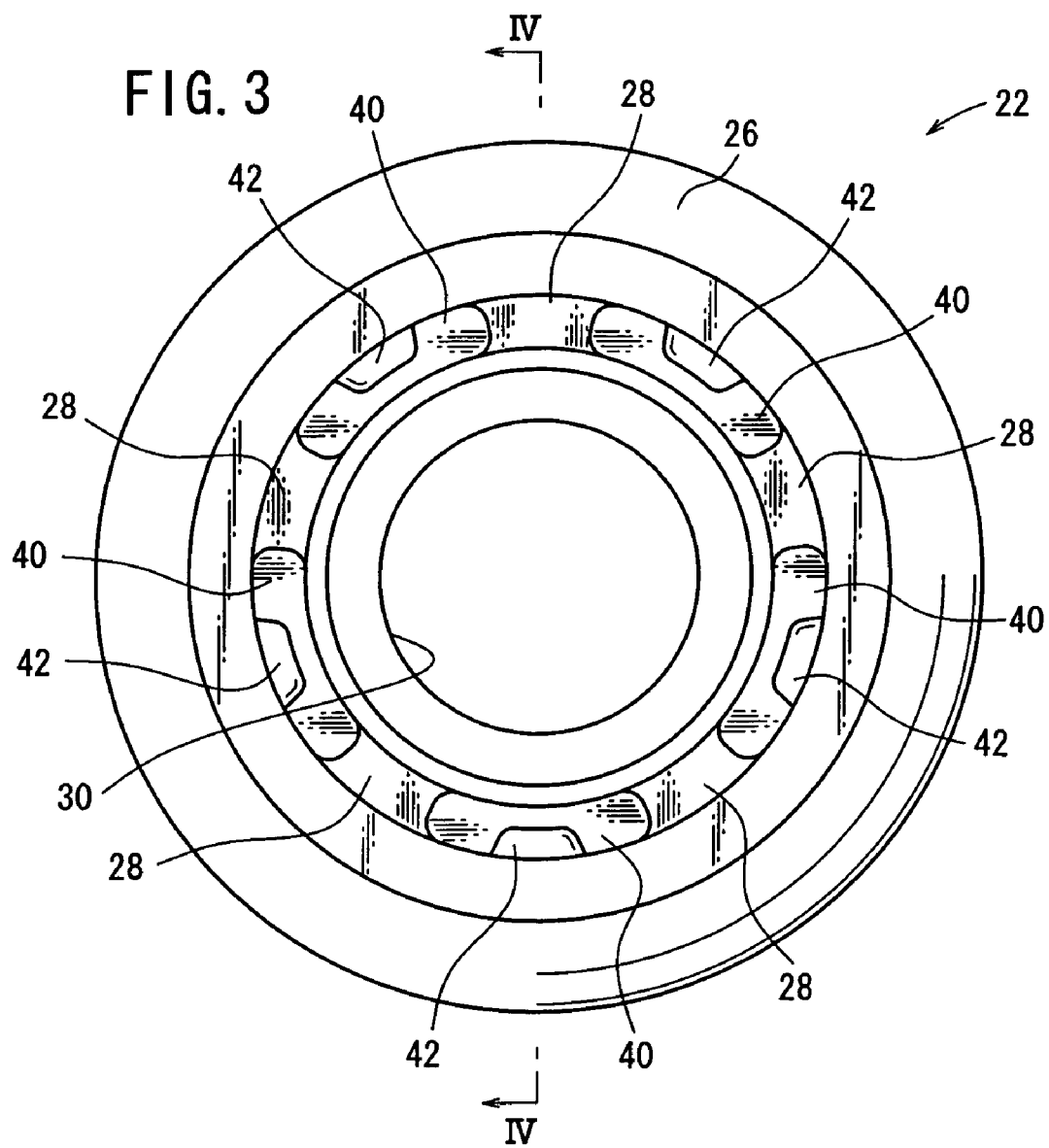
FIG. 3 is a side view of the dynamic damper according to the embodiment of the present invention.
Figure 4:
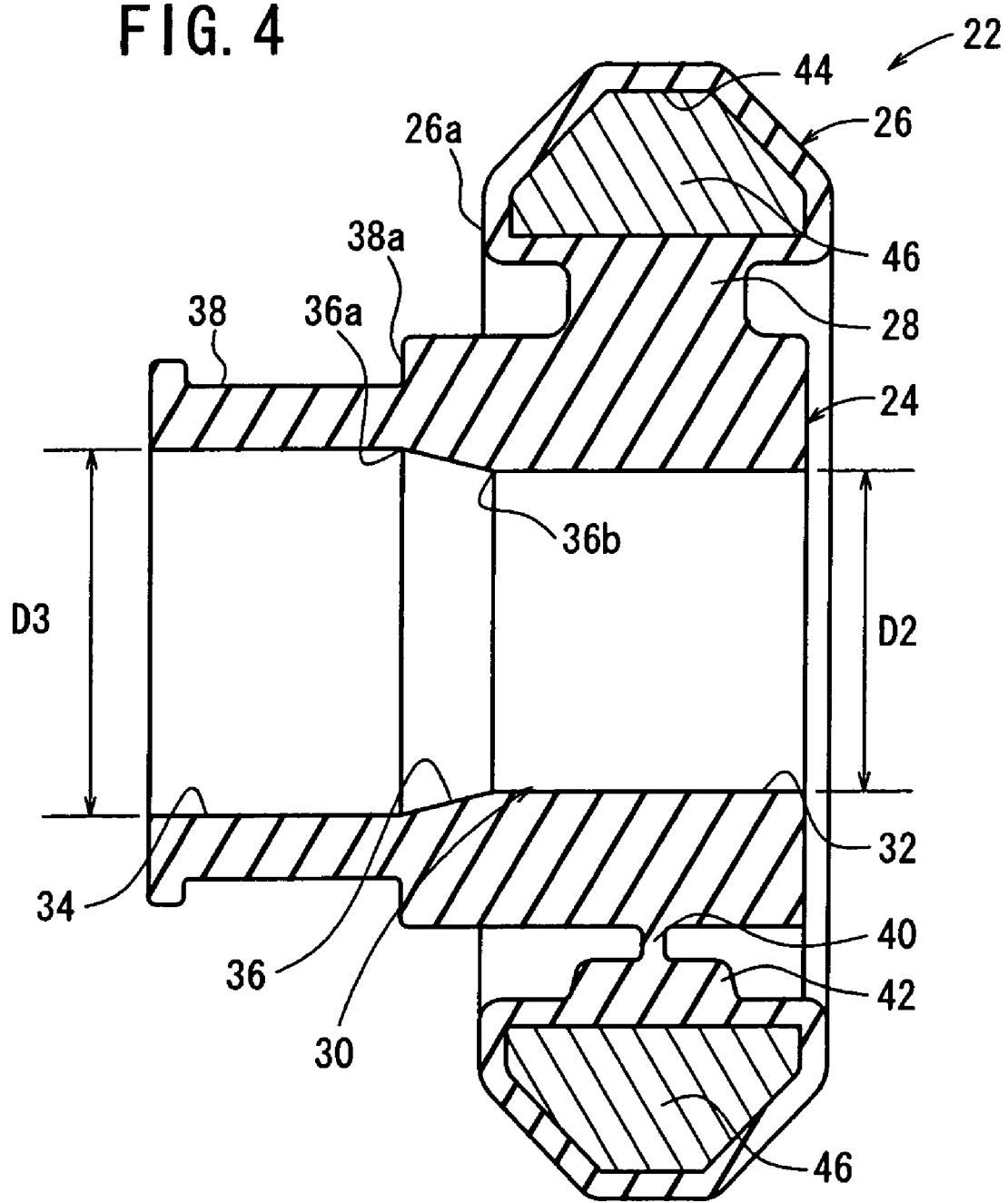
FIG. 4 is a vertical cross-sectional view taken along the IV-IV line of FIG. 3.

As shown in FIGS. 3 and 4, the dynamic damper 22 has a substantially cylindrical main body 24 surrounding an outer circumferential surface of the drive shaft 12, a single ring-shaped mass portion 26 disposed radially outwardly of the main body 24 in the vicinity of one axial direction end of the main body 24, and annular joint supports 28 joining the main body 24 and the mass portion 26.

The main body 24, the joint supports 28, and the mass portion 26 are integrally molded to form a single flexible member of a rubber material.

The main body 24 has a through hole 30 extending in the axial direction, and the drive shaft 12 is press-fitted in the through hole 30. The through hole 30 has a first hole portion 32 having an inner diameter D2, a second hole portion 34 having an inner diameter D3, and a tapered portion 36. The first hole portion 32 is formed at the one axial direction end of the main body 24 overlapping with the mass portion 26, the second hole portion 34 is formed at the other axial direction end not overlapping with the mass portion 26 in the radial direction, and the tapered portion 36 is formed between the first hole portion 32 and the second hole portion 34 and does not overlap with the mass portion 26 in the radial direction.

In this embodiment, the tapered portion 36 is formed such that the inner diameter is gradually reduced from the second hole portion 34 to the first hole portion 32. As shown in FIG. 4, a large-diameter starting end 36a of the tapered portion 36 substantially corresponds to a side wall 38a of an annular depression 38 formed on the outer circumferential surface of the main body 24, to be hereinafter described, in the radial direction, and a small-diameter terminal end 36b of the tapered portion 36 substantially corresponds to a side wall 26a of the mass portion 26 in the radial direction.

It is preferred that the starting end 36a is located at a position substantially corresponding to the side wall 38a of the annular depression 38 in the radial direction or a position closer to the joint supports 28 not overlapping with the annular depression 38 in the radial direction. When the main body 24 has varying radial direction thickness at the annular depression 38 and the band 20 is tightened on the annular depression 38, the main body 24 may be nonuniformly elastic-deformed and warped. In this case, the main body 24 is nonuniformly subjected to the tightening stress of the band 20, so that water penetration cannot be prevented.

It is preferred that the terminal end 36b is located at a position closer to the annular depression 38 not overlapping with the joint supports 28 in the radial direction. When the main body 24 has varying radial direction thickness at the joint supports 28, the main body 24 may be nonuniformly elastic-deformed and warped. In this case, a predetermined spring constant cannot be obtained, so that a desired function of damping vibrations of the drive shaft 12 cannot be achieved.

In this embodiment, the tapered portion 36 is formed between the first hole portion 32 having the uniform inner diameter D2 and the second hole portion having the uniform inner diameter D3, though not restrictive. An R portion having a predetermined curvature radius or a stepped portion may be formed instead of the tapered portion 36.

The annular depression 38, on which the band 20 such as a stainless steel band is wound, is formed on the outer circumferential surface of the main body 24 in the vicinity of the other axial direction end not overlapping with the mass portion 26 in the radial direction. When the band 20 is tightened on the annular depression 38, the dynamic damper 22 is fixed at a predetermined position on the drive shaft 12.

The length of the second hole portion 34 in the axial direction of the main body 24 is preferably greater than the width of the band 20 (the length of the band 20 in the axial direction of the main body 24).

The joint supports 28 are formed between the outer circumferential mass portion 26 and the inner circumferential main body 24. Five joint supports 28 project radially outwardly from the outer surface of the main body 24 at the same intervals in the circumferential direction. The joint supports 28 are composed of a flexible rubber material, and they elastically support the mass portion 26 by the flexibility.

A rubber membrane 40 is formed between each adjacent two of the joint supports 28, integrally with the joint supports 28, and radially inwardly of the mass portion 26. A thick rubber stopper 42 projecting radially inwardly is formed integrally with the rubber membrane 40 between each adjacent two of the joint supports 28. The rubber stoppers 42 can be brought into contact with the outer circumferential surface of the main body 24 to prevent the mass portion 26 from being excessively displaced toward the main body 24 in the radial direction.

A ring-shaped space 44 having a substantially triangular cross-section shape is formed in the ring-shaped mass portion 26, and a ring-shaped weight 46 having a chamfered triangular cross-section shape is placed in the space 44. In this embodiment, when the drive shaft 12 is vibrated, the weight 46 is displaced integrally with the mass portion 26 in the radial compressive/tensile direction.

The weight 46 may comprise a sintered body produced by sintering a tungsten alloy powder with a metal binder. A formed body produced by metal injection molding (MIM) or powder injection molding (PIM) may be used instead of the sintered body. Thus obtained weight 46 generally has a specific gravity of more than 14, e.g., a high specific gravity of 17 or more, and hence has a very large weight.

Preferred examples of the tungsten alloys include W-1.8Ni-1.2Cu (specific gravity 18.5, each numeral prior to the element symbol represents the weight ratio %, the same being true with the examples below), W-3.0Ni-2.0Cu (specific gravity 17.8), W-5.0Ni-2.0Fe (specific gravity 17.4), and W-3.5Ni-1.5Fe (specific gravity 17.6). The specific gravity of the weight 46 made of the tungsten alloy is more than twice compared with weights made of iron materials. If the weight 46 has the same mass as the weights made of iron materials, then the weight 46 has a volume which is about ⅓ to ½ of those weights.

In other words, if the weight 46 is made of the tungsten alloy, then their size is much smaller than the conventional weights of iron materials.

The relationship between the outer diameter D1 of the drive shaft 12 and the inner diameters D2 and D3 of the first and second hole portions 32, 34 of the through hole 30 formed in the main body 24 will be described below.

The first hole portion 32 is formed at the one axial direction end of the main body 24 overlapping with the mass portion 26 in the radial direction. The inner diameter D2 of the first hole portion 32 is smaller than the outer diameter D1 of the drive shaft 12 to be press-fitted in the first hole portion 32 (D1>D2).

Further, the second hole portion 34 is formed at the other axial direction end of the main body 24 not overlapping with the mass portion 26 in the radial direction, the band 20 is tightened on the annular depression 38. The inner diameter D3 of the second hole portion 34 is larger than the inner diameter D2 of the first hole portion 32 formed at the one axial direction end of the main body 24 and smaller than the outer diameter D1 of the drive shaft 12 (D1>D3>D2).

The above relational expressions are satisfied not only in the dynamic damper having one mass portion 26 shown in FIG. 4 but also in a dynamic damper having two or more mass portions according to the present invention (not shown).

In this embodiment, in the main body 24, the one axial direction end with the first hole portion 32 has a wall thickness that is thicker than that of the other axial direction end with the second hole portion 34.

The dynamic damper 22 according to the embodiment of the present invention is basically constructed as described above. Operation and advantages of the dynamic damper 22 will be described below.

First, the drive shaft 12 is pressed into the first hole portion 32 of the through hole 30 in the main body 24 and inserted through the second hole portion 34 to a predetermined position. Then, the band 20 is wound and tightened on the annular depression 38 of the main body 24. The dynamic damper 22 is positioned and fixed at a desired position on the drive shaft 12.

In the drive force transmitting mechanism 10 mounted on a vehicle, the dynamic damper 22 is mounted on the drive shaft 12 as described above. When the drive shaft 12 is vibrated for some reasons, the mass portion 26 containing the weight 46 is subjected to tensile/compressive deformation through the joint supports 28.

Specifically, when the drive shaft 12 is undesirably vibrated, the vibrations are transmitted from the main body 24 through the joint supports 28 to the mass portion 26. The resonant frequency of the mass portion 26 containing the weight 46 is adapted to the frequency of the unwanted vibrations. Thus, at this time, the mass portion 26 is extended and contracted from the joint supports 28 in the radial direction of the drive shaft 12, i.e., is subjected to the tensile/compressive deformation.

The dynamic damper of the present invention may be subjected to shearing deformation such that it is pulled along the circumference of the drive shaft 12 in the direction opposite to the rotation direction of the drive shaft 12 (such a dynamic damper will be described hereinafter). Of course, the dynamic damper may be such that it is subjected to the tensile/compressive deformation and the shearing deformation simultaneously.

Upon the tensile/compressive deformation and/or the shearing deformation, the mass portion 26 resonates. The mass portion 26 has substantially the same resonant frequency, the vibrational energy developed in the drive shaft 12 is absorbed by the joint supports 28, and the vibrations are preferably damped. Thus, the vibrations of the drive shaft 12 are damped by the resonance of the mass portion 26 (the weight 46), elastically supported by the flexible joint supports 28.

In this embodiment, the first hole portion 32 is formed at the one axial direction end of the main body 24 overlapping with the mass portion 26 in the radial direction, the second hole portion 34 is formed at the other axial direction end of the main body 24 not overlapping with the mass portion 26 in the radial direction, the band 20 being tightened thereon, and the inner diameter D2 of the first hole portion 32 is smaller than the inner diameter D3 of the second hole portion 34 (D3>D2). Further, the outer diameter D1 of the drive shaft 12 to be press-fitted is larger than the inner diameter D2 of the first hole portion 32 and the inner diameter D3 of the second hole portion 34 (D1>D3>D2).

Thus, in this embodiment, the inner diameter D2 of the first hole portion 32, formed at the one axial direction end of the main body 24 overlapping with the mass portion 26 in the radial direction, is smaller than the outer diameter D1 of the drive shaft 12 to be press-fitted, whereby the inner wall of the first hole portion 32 can be in sufficient contact with the outer circumferential surface of the drive shaft 12 such that water penetration between the surfaces can be prevented effectively.

Further, in this embodiment, the inner diameter D3 of the second hole portion 34 is larger than the inner diameter D2 of the first hole portion 32. The second hole portion 34 is formed at the other axial direction end of the main body 24 not overlapping with the mass portion 26 in the radial direction. The wall thickness of the main body 24 is thinner in the vicinity of the other end, and the band 20 is tightened along the annular depression 38 formed on the thinner portion of the outer circumferential surface of the main body 24, whereby the through hole can be in sufficient contact with the outer circumferential surface of the drive shaft 12 at the other end as with at the one end of the main body 24 such that the penetration of water can be prevented effectively.

As a result, in this embodiment, both of the one axial direction end and the other axial direction end of the main body 24 can be in excellent contact with the drive shaft 12, so that water penetration through a clearance between the inner wall of the through hole 30 and the outer circumferential surface of the drive shaft 12 can be prevented at both ends.

Further, in this embodiment, a force required to press-fit the drive shaft 12 in the through hole 30 of the main body 24 is different between at the thick-walled portion in the vicinity of the one axial direction end and at the thin-walled portion in the vicinity of the other axial direction end, and also elastic deformation of the main body 24 is different between the first and second hole portions 32, 34 of the through hole 30 in the main body 24. That is, the elastic deformation and the press-fitting force are large at the one end of the main body 24 overlapping with the mass portion 26 (at the first hole portion 32), while the elastic deformation and the press-fitting force are small at the other thin-walled end of the main body 24 not overlapping with the mass portion 26 (at the second hole portion 34).

Thus, in this embodiment, the attachment of the drive shaft 12 to the main body 24 can be improved, and the deformation of the thin-walled portion can be prevented, so that deterioration of the characteristics of the dynamic damper 22 can be prevented.

Figure 5:
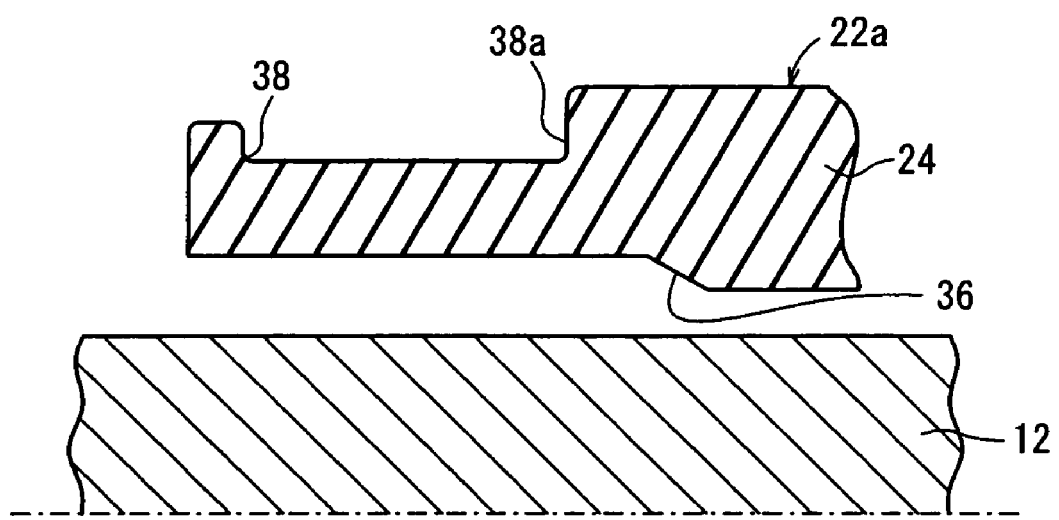
FIG. 5 is a partly enlarged vertical cross-sectional view of a dynamic damper according to another embodiment of the present invention in which a drive shaft is not press-fitted.
Figure 6:
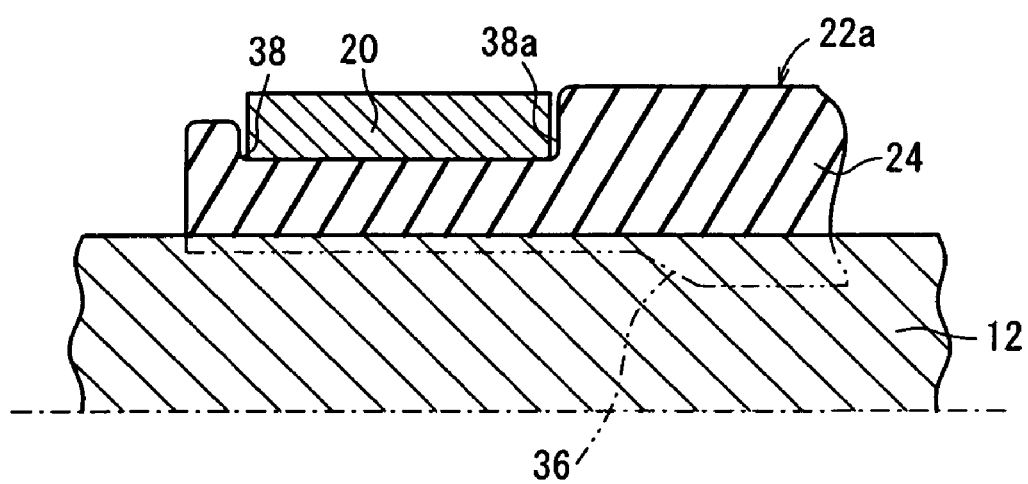
FIG. 6 is a partly enlarged vertical cross-sectional view of the dynamic damper of FIG. 5 in which the drive shaft is press-fitted.

A dynamic damper according to another embodiment of the present invention is shown in FIGS. 5 and 6. The same components in the above described embodiment and the following embodiment are represented by the same numerals, and duplicate explanations therefor are omitted.

The dynamic damper 22a according to another embodiment may achieve the same effects as the dynamic damper 22 according to the above embodiment except that the starting end 36a of the tapered portion 36 is positioned closer to the one axial direction end of the main body 24.

Figure 7:
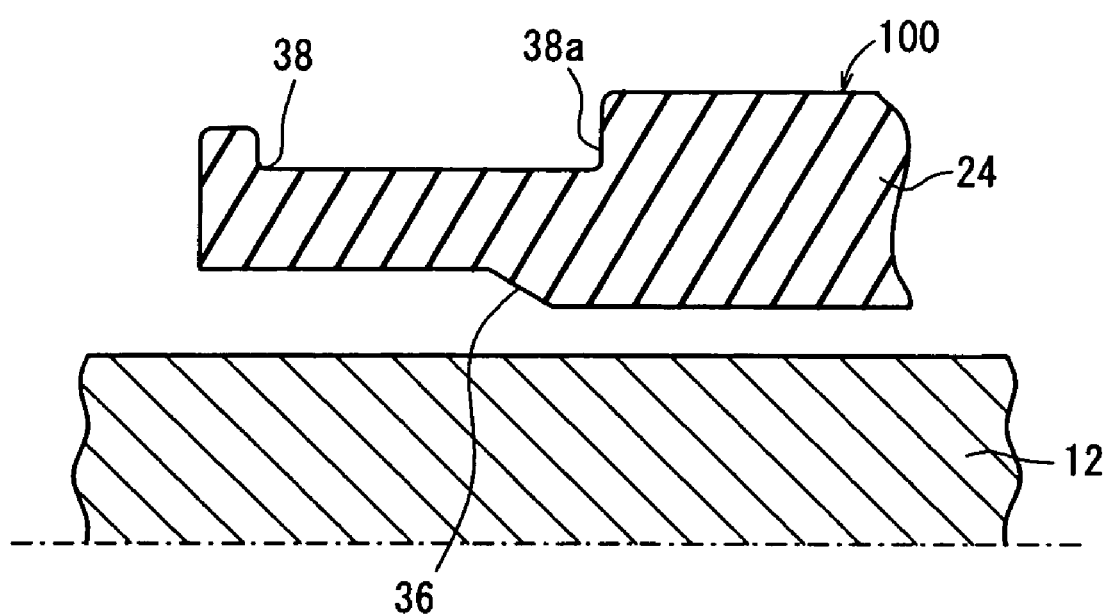
FIG. 7 is a partly enlarged vertical cross-sectional view of a dynamic damper according to a comparative embodiment in which a drive shaft is not press-fitted.
Figure 8:
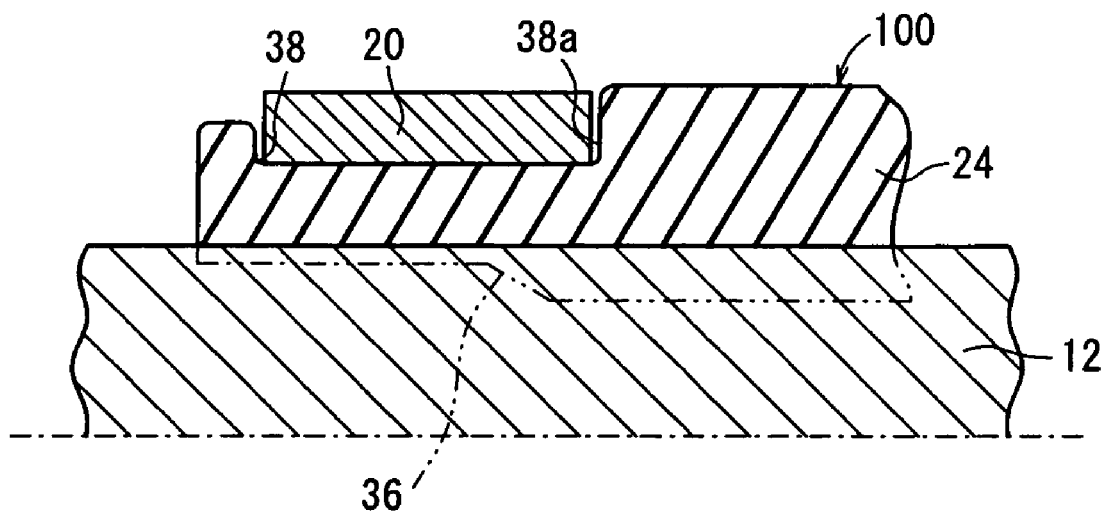
FIG. 8 is a partly enlarged vertical cross-sectional view of the dynamic damper of FIG. 7 in which the drive shaft is press-fitted.

A dynamic damper 100 shown in FIGS. 7 and 8 according to a comparative example is different from the dynamic damper 22a according to the other embodiment in that the tapered portion 36 is closer to the opposite end. The tapered portion 36 is positioned closer to the other axial direction end of the main body 24, and a portion that is elastically deformed by tightening the band 20 overlaps with a portion that is elastically deformed by press-fitting. Thus, when the band 20 is tightened on the main body 24, the overlapped portion is disadvantageously warped.

Figure 9:
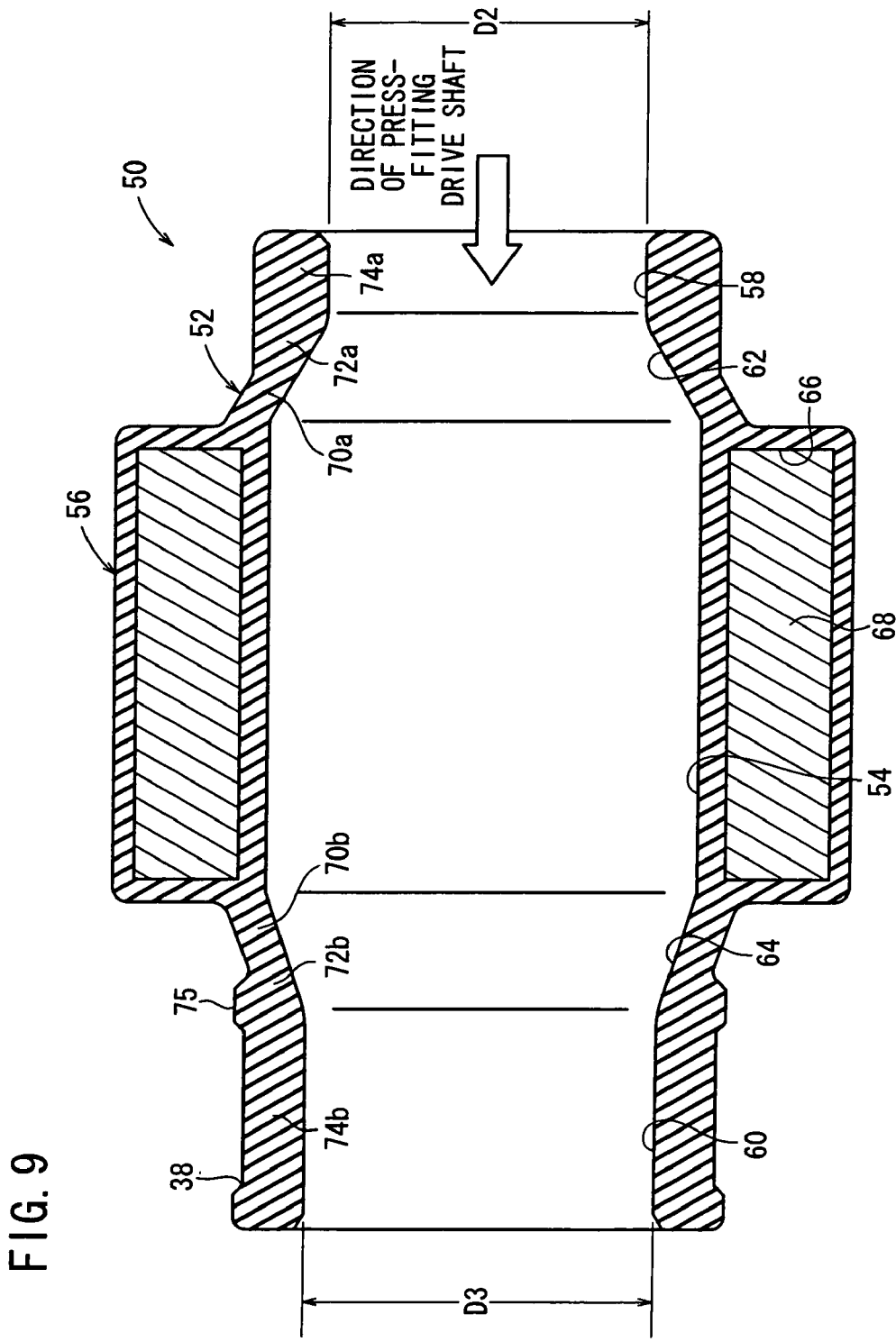
FIG. 9 is a vertical cross-sectional view of a dynamic damper according to a further embodiment of the present invention, in the axial direction.
Figure 10:
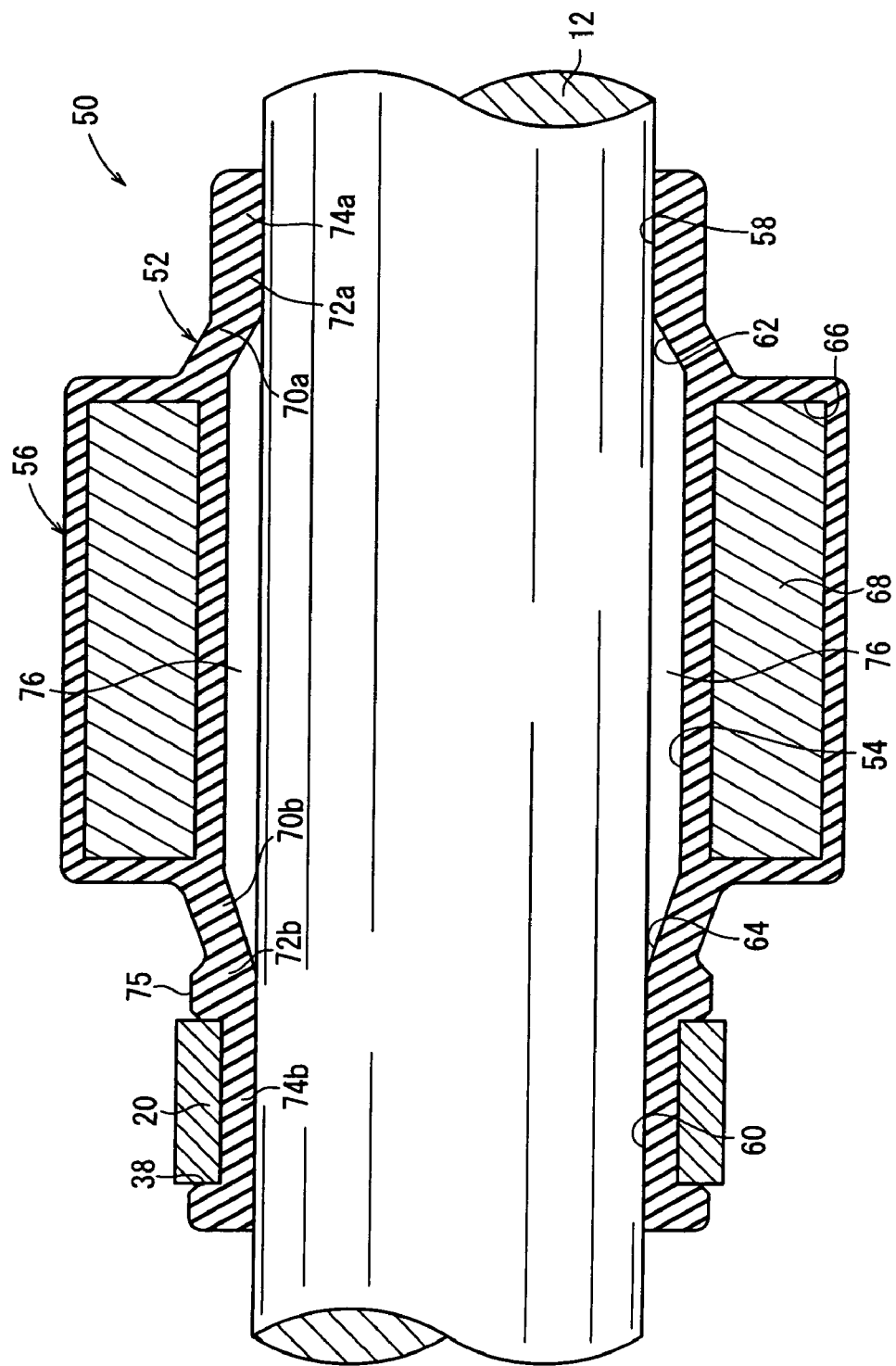
FIG. 10 is a vertical cross-sectional view of the dynamic damper of FIG. 9 in which a drive shaft is press-fitted.

A dynamic damper 50 according to a further embodiment of the present invention is shown in FIGS. 9 and 10.

The dynamic damper 50 according to the further embodiment is capable of efficiently damping such a shearing deformation that the dynamic damper 50 is pulled along the circumference of the drive shaft 12 in the direction opposite to the rotation direction of the drive shaft 12.

In a cylindrical main body 52, a through hole 54 extends in the axial direction. The through hole 54 has a first hole portion 58 having an inner diameter D2, a second hole portion 60 having an inner diameter D3, a first tapered portion 62, and a second tapered portion 64. A mass portion 56 is disposed in the vicinity of one axial direction end of the main body 52, and the first hole portion 58 is formed at the one axial direction end. The second hole portion 60 is formed at the other axial direction end not overlapping with the mass portion 56 in the radial direction. The first tapered portion 62 is formed on the inner wall of the main body 52 between the first hole portion 58 and the mass portion 56 and does not overlap with the mass portion 56 in the radial direction. The second tapered portion 64 is formed on the main body 52 between the second hole portion 60 and the mass portion 56 and does not overlap with the mass portion 56 in the radial direction. A ring-shaped weight 68 having a rectangular cross-section shape is placed in a space 66 of the mass portion 56.

The first tapered portion 62 is formed such that the inner diameter is gradually reducing in the axial direction from the mass portion 56 to the first hole portion 58. The second tapered portion 64 is formed such that the inner diameter is gradually reducing in the axial direction from the mass portion 56 to the second hole portion 60. The inclination angle of the first tapered portion 62 is larger than that of the second tapered portion 64.

In the one end of the main body 52, which is connected to the mass portion 56 disposed in an intermediate portion of the main body 52, a first elastic portion 70a contiguous to the mass portion 56 elastically supports the weight 68 in the shear direction, a first buffer portion 72a contiguous to the first elastic portion 70a has a substantially uniform outer diameter, and a thick-walled first fixation portion 74a contiguous to the first buffer portion 72a has the first hole portion 58 with the inner diameter D2.

In the other end of the main body 52, which is connected to the mass portion 56 disposed in the intermediate portion of the main body 52, a second elastic portion 70b contiguous to the mass portion 56 elastically supports the weight 68 in the shear direction, a second buffer portion 72b contiguous to the second elastic portion 70b has an annular protrusion 75 formed on the outer circumferential surface thereof, a second fixation portion 74b contiguous to the second buffer portion 72b has an annular depression 38 formed on the outer circumferential surface and the second hole portion 60 with the inner diameter D3 formed on the inner circumferential surface thereof, and a band 20 is tightened on the annular depression 38. The first elastic portion 70a and the second elastic portion 70b do not overlap with the first fixation portion 74a and the second fixation portion 74b, respectively, in the radial direction.

In this embodiment, the first hole portion 58 is formed at the one axial direction end of the main body 52 overlapping with the mass portion 56 in the radial direction, and the inner diameter D2 of the first hole portion 58 is smaller than the outer diameter D1 of the drive shaft 12 to be press-fitted in the first hole portion 58 (D1>D2).

Further, the second hole portion 60 is formed at the other axial direction end of the main body 52 not overlapping with the mass portion 56 in the radial direction, the band 20 is tightened on the annular depression 38, and the inner diameter D3 of the second hole portion 60 is larger than the inner diameter D2 of the first hole portion 58 at the one axial direction end and smaller than the outer diameter D1 of the drive shaft 12 (D1>D3>D2).

The inner diameter D2 of the first fixation portion 74a is preferably 80% to 85% of the outer diameter D1 of the drive shaft 12. When the inner diameter D2 is less than 80% of the outer diameter D1, the first fixation portion 74a may be broken in the process of press-fitting the drive shaft 12 from the first hole portion 58 to the second hole portion 60 in the main body 52, and the dynamic damper 50 cannot be mounted by hand of an operator. On the other hand, when the inner diameter D2 is more than 85% of the outer diameter D1, the contact between the first fixation portion 74a and the drive shaft 12 is weak, and it is difficult to maintain sufficient sealing for preventing the water penetration.

As shown in FIG. 10, when the drive shaft 12 is press-fitted in the dynamic damper 50 according to the further embodiment, the inner portion of the mass portion 56 is separate from the outer surface of the drive shaft 12 in the radial direction, and a clearance 76 is formed between the first tapered portion 62 and the second tapered portion 64 in the axial direction.

When the dynamic damper 50 is subjected to shearing deformation such that it is pulled in the direction opposite to the rotation direction of the drive shaft 12, vibrations of the drive shaft 12 can be efficiently damped by the clearance 76. In the dynamic damper 50 according to the further embodiment, the main body 52 can be in sufficient contact with the outer circumferential surface of the drive shaft 12 at the other end as with at the one end, such that the penetration of water can be prevented effectively in the same manner as the above embodiments.

In the further embodiment, the drive shaft 12 is press-fitted in the main body 52 of the dynamic damper 50 from the first fixation portion 74a having the first hole portion 58 with the smaller inner diameter D2 to the second fixation portion 74b having the second hole portion 60 with the larger inner diameter D3, and the dynamic damper 50 is attached (fixed) to a predetermined portion of the drive shaft 12.

In this embodiment, when the drive shaft 12 is inserted from the first hole portion 58 with the smaller inner diameter D2, the first elastic portion 70a is compressive-deformed in the axial direction of the main body 52. When the drive shaft 12 is inserted oppositely from the second hole portion 60 of the main body 52 with the larger inner diameter D3 and pressed through the second hole portion 60 to the first hole portion 58, the first elastic portion 70a is tensile-deformed in the axial direction of the main body 52 (the direction of pressing the drive shaft 12) due to obstacle of the smaller inner diameter D2 against the drive shaft 12.

The axial direction load applied to the first elastic portion 70a is an important factor for setting the spring constant of the dynamic damper 50. It is supposed that the load of the above tensile deformation is larger than that of the above compressive deformation, and the dynamic damper 50 may be broken in the tensile deformation. In the further embodiment, the first elastic portion 70a can be preferably protected in the process of attaching the dynamic damper 50 to the drive shaft 12, and the yield of the product can be increased.

Figure 11:
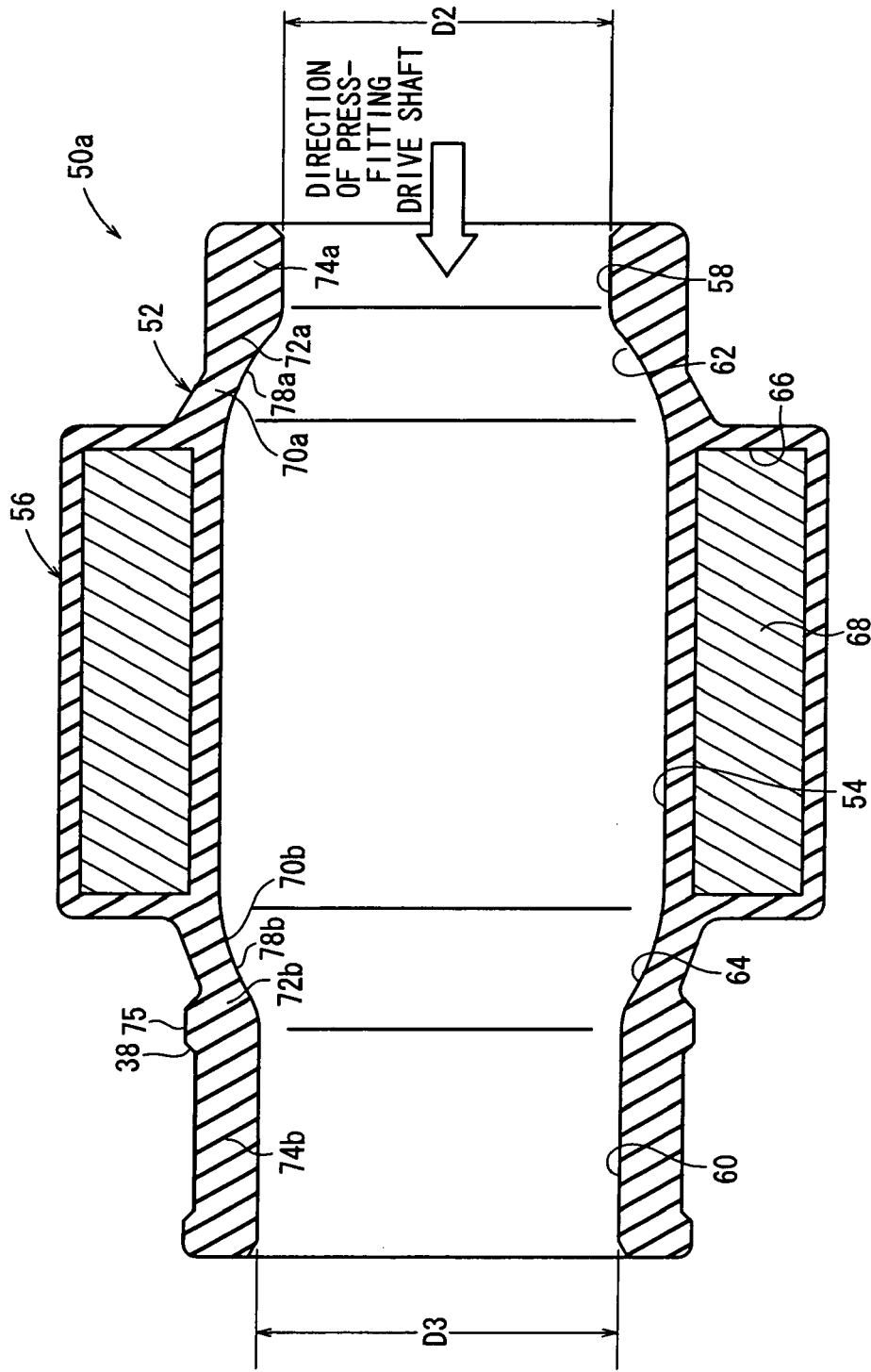
FIG. 11 is a vertical cross-sectional view of a dynamic damper according to a modification example of the dynamic damper of FIG. 9, in the axial direction.
Figure 12:
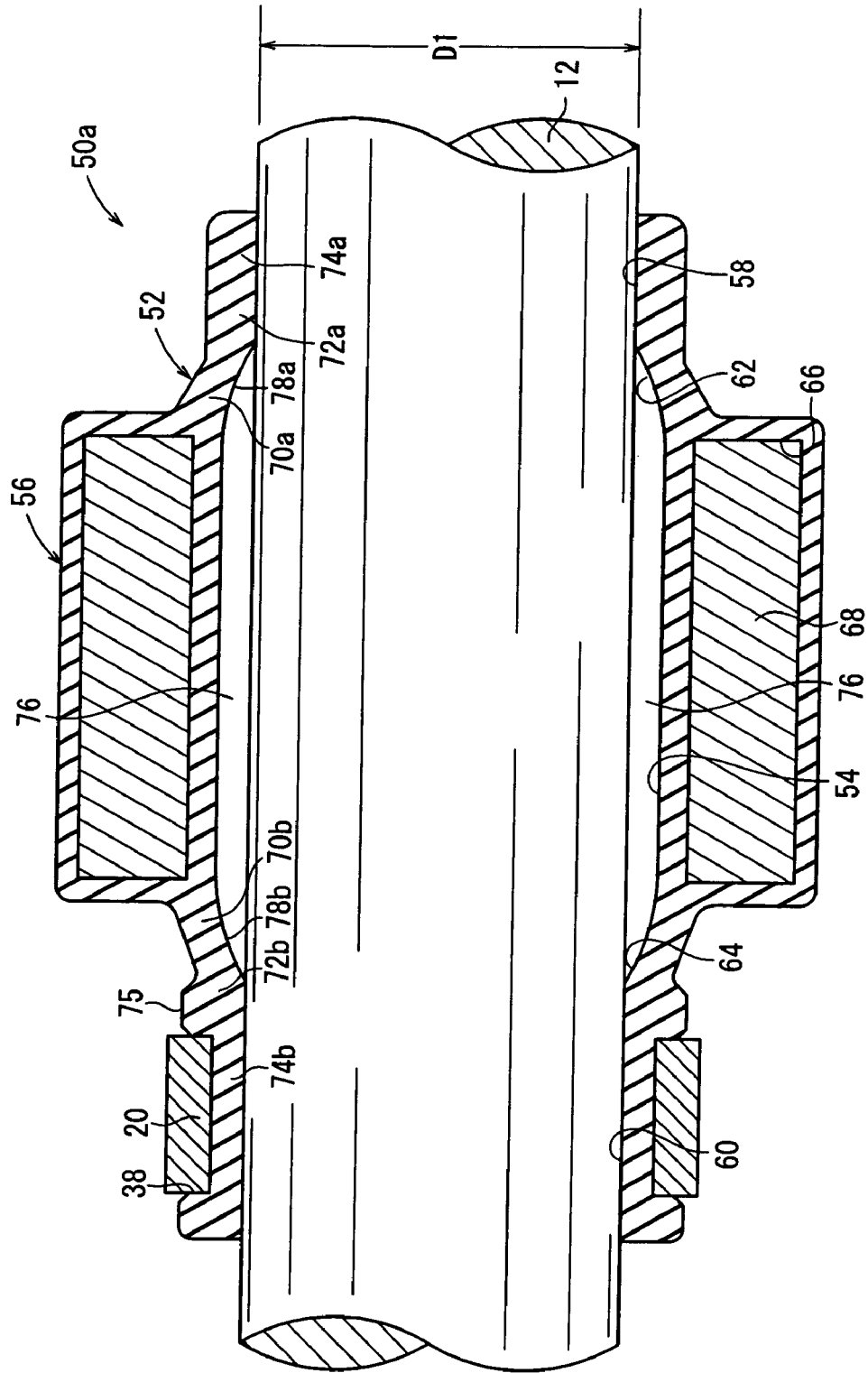
FIG. 12 is a vertical cross-sectional view of the dynamic damper of FIG. 11 in which a drive shaft is press-fitted.

A dynamic damper 50a of FIGS. 11 and 12 is a modification example of the dynamic damper 50 of FIGS. 9 and 10 according to the further embodiment, and a first R portion 78a and a second R portion 78b each having a predetermined curvature radius are formed on the inner wall of the main body 52 instead of the first tapered portion 62 and the second tapered portion 64. The dynamic damper 50a has the same advantageous effects as above.

The invention claimed is:

1. A dynamic damper for damping vibrations of a rotational shaft, comprising:
    a substantially cylindrical main body having a through hole in which said rotational shaft is press-fitted;
    a mass portion containing a weight, disposed radially outwardly of said main body in the vicinity of one axial direction end of said main body;
    a flexible annular joint support disposed between said main body and said mass portion; and
    a band which is tightened on a portion of said main body in the vicinity of another axial direction end of said main body to fix said main body to said rotational shaft, said portion not overlapping with said mass portion in a radial direction,
    wherein, when D1 represents an outer diameter of said rotational shaft, D2 represents an inner diameter of said through hole at said one axial direction end of said main body where said mass portion is disposed outwardly, and D3 represents an inner diameter of said through hole at said other axial direction end of said main body where said mass portion is not disposed outwardly,
    said outer diameter D1, said inner diameter D2, and said inner diameter D3 satisfy respective relational expressions of D1>D2, and D1>D3>D2.

2. A dynamic damper according to claim 1, wherein a first hole portion having an inner diameter D2 is formed at one end of said through hole, a second hole portion having an inner diameter D3 is formed at another end of said through hole, and a tapered portion is formed between said first hole portion and said second hole portion, said tapered portion being located in a position not overlapping with said portion of said main body on which said band is tightened, in the radial direction.

* * * * *